United States Patent
Ramin

(10) Patent No.: US 11,749,520 B2
(45) Date of Patent: Sep. 5, 2023

(54) ELECTRODE FOR A DISCHARGE CHAMBER

(71) Applicant: Cymer, LLC, San Diego, CA (US)

(72) Inventor: Leyla Ramin, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 17/411,155

(22) Filed: Aug. 25, 2021

(65) Prior Publication Data

US 2021/0384027 A1    Dec. 9, 2021

Related U.S. Application Data

(63) Continuation of application No. 16/955,952, filed as application No. PCT/US2018/065832 on Dec. 14, 2018, now Pat. No. 11,127,582.

(60) Provisional application No. 62/616,357, filed on Jan. 11, 2018.

(51) Int. Cl.
*H01J 61/16* (2006.01)
*H01J 61/073* (2006.01)
*H01J 9/14* (2006.01)
*H01S 3/038* (2006.01)
*H01S 3/225* (2006.01)

(52) U.S. Cl.
CPC ............ *H01J 61/0735* (2013.01); *H01J 9/14* (2013.01); *H01J 61/16* (2013.01); *H01S 3/0381* (2013.01); *H01S 3/0382* (2013.01); *H01S 3/0388* (2013.01); *H01S 3/2251* (2013.01); *H01S 3/2256* (2013.01); *H01S 3/2258* (2013.01)

(58) Field of Classification Search
CPC ...... H01S 3/2251; H01S 3/2256; H01J 61/16; H01J 61/0735

USPC .......................................................... 313/633
See application file for complete search history.

(56) References Cited

U.S. PATENT DOCUMENTS

| | | | |
|---|---|---|---|
| 6,370,174 B1 | 4/2002 | Onkels et al. | |
| 6,690,706 B2 | 2/2004 | Morton et al. | |
| 7,095,774 B2 | 8/2006 | Morton et al. | |

(Continued)

FOREIGN PATENT DOCUMENTS

| | | |
|---|---|---|
| JP | 2001274488 A | 10/2001 |
| JP | 2005503027 A | 1/2005 |

(Continued)

OTHER PUBLICATIONS

Office Action, Examiner Takanobu Onishi of the Japan Patent Office, counterpart Japanese Patent Application No. 2020-533024, dated Sep. 10, 2021, 15 pages total (including English translation of 8 pages).

(Continued)

*Primary Examiner* — Christopher M Raabe
(74) *Attorney, Agent, or Firm* — DiBerardino McGovern IP Group LLC

(57) ABSTRACT

A discharge chamber for a deep ultraviolet (DUV) light source includes a housing; and a first electrode and a second electrode in the housing, the first electrode and the second electrode being separated from each other to form a discharge region between the first electrode and the second electrode, the discharge region being configured to receive a gain medium including at least one noble gas and a halogen gas. At least one of the first electrode and the second electrode includes a metal alloy including more than 33% and less than 50% zinc by weight.

23 Claims, 9 Drawing Sheets

(56) References Cited

U.S. PATENT DOCUMENTS

| | | | |
|---|---|---|---|
| 2002/0185977 A1 | 12/2002 | Saitou et al. | |
| 2002/0191661 A1 | 12/2002 | Morton et al. | |
| 2004/0066827 A1 | 4/2004 | Steiger et al. | |
| 2004/0071178 A1 | 4/2004 | Dyer et al. | |
| 2012/0155501 A1* | 6/2012 | Ferrasse | H01S 3/0388 |
| | | | 148/564 |
| 2013/0329763 A1 | 12/2013 | Kardokus et al. | |
| 2018/0320250 A1* | 11/2018 | Ramin | H01S 3/2251 |

FOREIGN PATENT DOCUMENTS

| | | | |
|---|---|---|---|
| JP | 2007500939 A | 1/2007 | |
| JP | 2012009892 A | 1/2012 | |
| JP | 2015527726 A | 9/2015 | |
| KR | 20040031790 A | 4/2004 | |
| KR | 20060054359 A | 5/2006 | |
| WO | 0237629 A1 | 5/2002 | |
| WO | WO-0237629 A1 * | 5/2002 | G03F 7/70025 |
| WO | 2003023910 A2 | 3/2003 | |
| WO | 2005013441 A2 | 2/2005 | |

OTHER PUBLICATIONS

Shane Thomas, United States International Searching Authority, International Search Report and Written Opinion, corresponding PCT Application No. PCT/US2018/065832, dated Apr. 26, 2019, 11 pages total.

First Office Action and Search Report, counterpart Chinese Patent Application No. 201880086276.2, dated Nov. 3, 2022, 9 pages total (including English translation of 3 pages).

Examination Bureau, Korean Intellectual Property Office, Office Action, counterpart Korean Patent Application No. 10-2023-7011650, dated May 12, 2023, 7 pages total (including English translation of 3 pages).

* cited by examiner

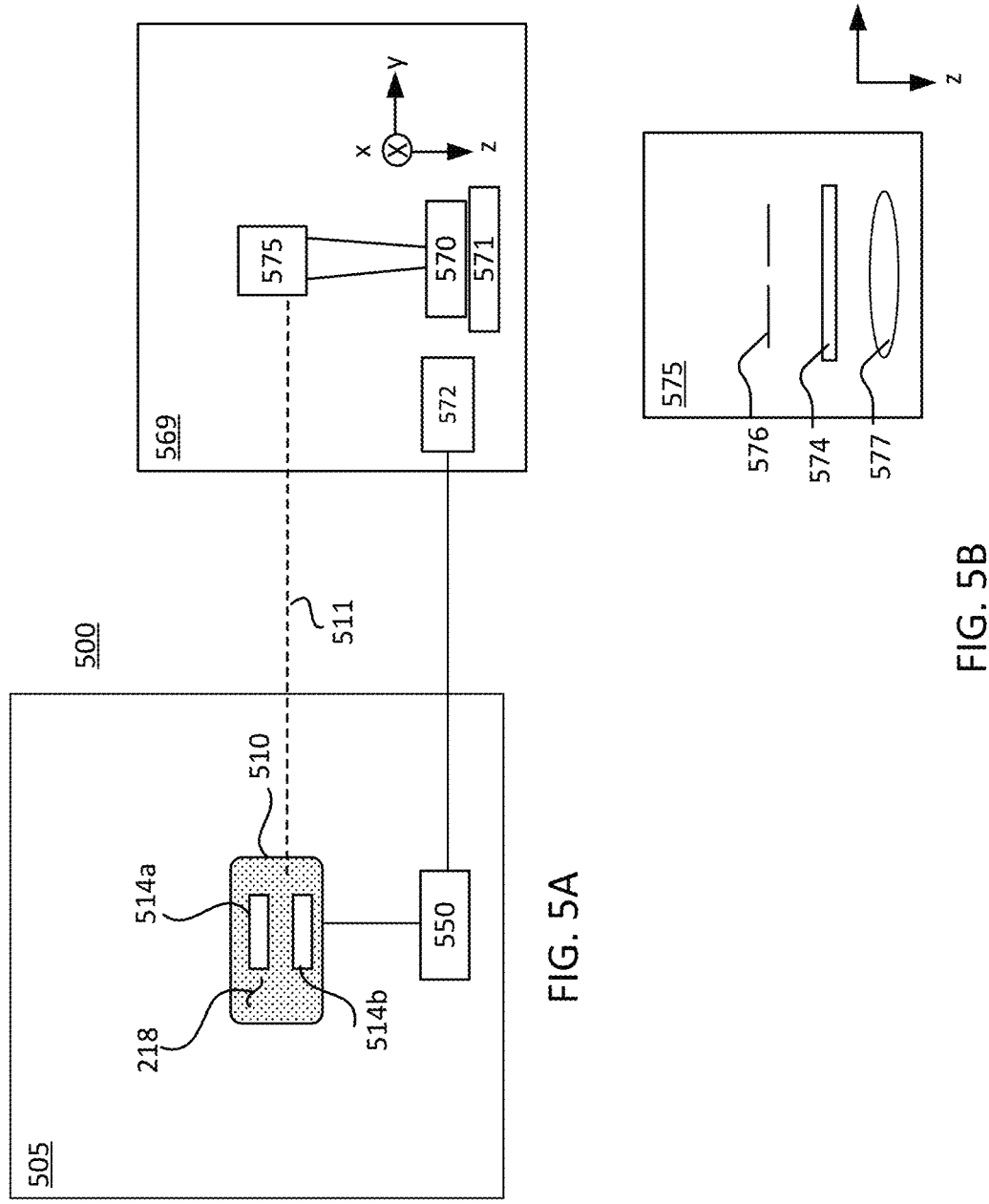

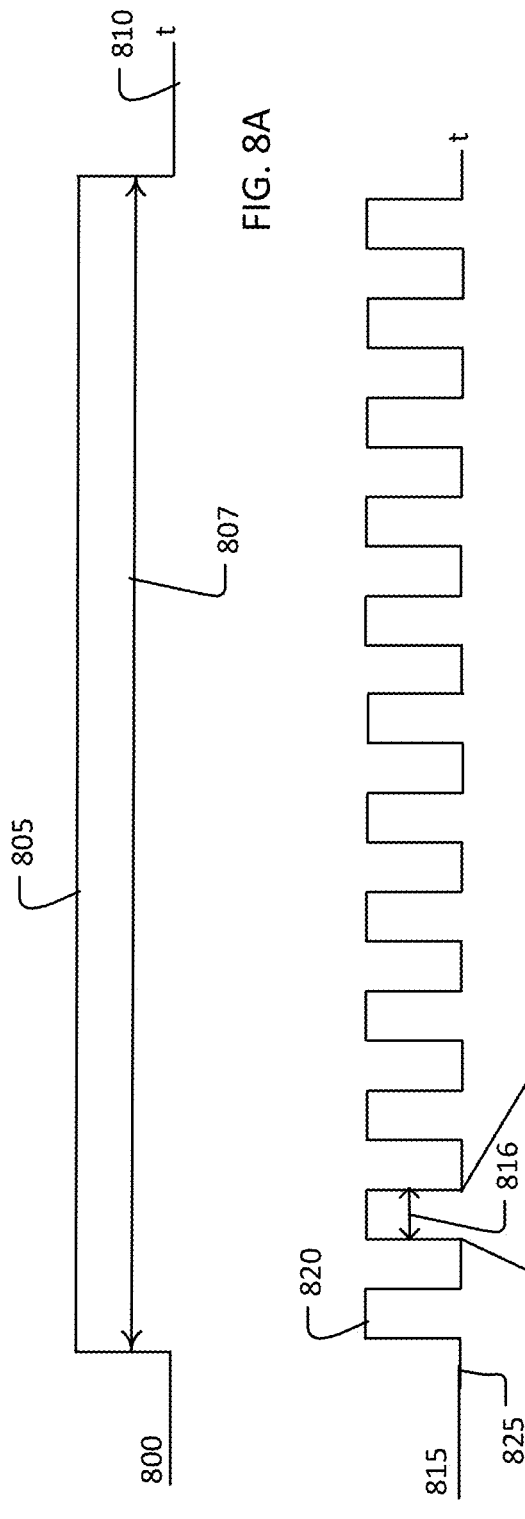
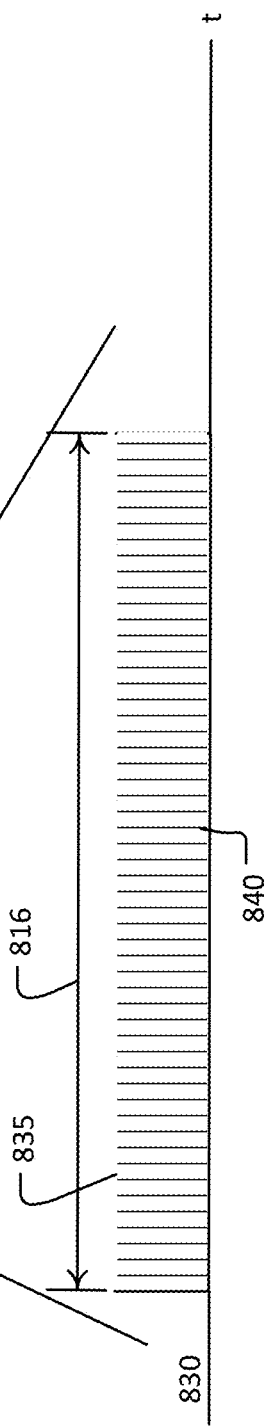

ELECTRODE FOR A DISCHARGE CHAMBER

CROSS REFERENCE TO RELATED APPLICATION

This application is a continuation of U.S. application Ser. No. 16/955,952, filed Jun. 19, 2020 and titled "ELECTRODE FOR A DISCHARGE CHAMBER;" which is the National Phase of PCT/US2018/065832, filed on Dec. 14, 2018, and titled "ELECTRODE FOR A DISCHARGE CHAMBER;" which claims priority of U.S. Application No. 62/616,357, filed on Jan. 11, 2018, and titled "ELECTRODE FOR A DISCHARGE CHAMBER." Each of these patent applications is incorporated herein in its entirety by reference.

TECHNICAL FIELD

This disclosure relates to electrodes for a discharge chamber. The discharge chamber may be part of, for example, a deep ultraviolet light (DUV) source.

BACKGROUND

Photolithography is the process by which semiconductor circuitry is patterned on a substrate such as a silicon wafer. A photolithography optical source provides the deep ultraviolet (DUV) light used to expose a photoresist on the wafer. One type of gas discharge light source used in photolithography is known as an excimer light source or laser. An excimer light source typically uses a combination of one or more noble gases, such as argon, krypton, or xenon, and a reactive such as fluorine or chlorine. The excimer light source derives its name from the fact that under the appropriate condition of electrical stimulation (energy supplied) and high pressure (of the gas mixture), a pseudo-molecule called an excimer is created, which only exists in an energized state and gives rise to amplified light in the ultraviolet range. An excimer light source produces a light beam that has a wavelength in the deep ultraviolet (DUV) range and this light beam is used to pattern semiconductor substrates (or wafers) in a photolithography apparatus. The excimer light source can be built using a single gas discharge chamber or using a plurality of gas discharge chambers.

SUMMARY

In one general aspect, a discharge chamber for a deep ultraviolet (DUV) light source includes a housing; and a first electrode and a second electrode in the housing, the first electrode and the second electrode being separated from each other to form a discharge region between the first electrode and the second electrode, the discharge region being configured to receive a gain medium including at least one noble gas and a halogen gas. At least one of the first electrode and the second electrode includes a metal alloy including more than 33% and less than 50% zinc by weight.

Implementations may include one or more of the following features. The first electrode may be a cathode and the second electrode may an anode, and the second electrode may be the metal alloy including more than 33% and less than 50% zinc by weight. The metal alloy also may include copper. The halogen gas may include fluorine. The noble gas may include argon, krypton, neon, and/or xenon. The metal alloy of the second electrode may include between 35% and 50% zinc by weight. The metal alloy of the second electrode may include between 37% and 50% zinc by weight. The metal alloy of the second electrode may include between 40% and 50% zinc by weight. The metal alloy of the second electrode may include more than 33% and less than 45% zinc by weight.

The first electrode may include more than 33% and less than 40% zinc by weight, and the second electrode may include more than 33% and less than 50% zinc by weight.

In another general aspect, a deep ultraviolet (DUV) light source includes a master oscillator includes a first master oscillator electrode and a second master oscillator electrode, the first master oscillator electrode and the second master oscillator electrode being separated from each other to form a master oscillator discharge region, the master oscillator discharge region configured to receive a gain medium including a noble gas and a halogen gas. At least one of the first master oscillator electrode and the second master oscillator electrode include a metal alloy including more than 33% and less than 50% zinc by weight, and a power amplifier on a beam path, wherein, in operational use, the master oscillator produces a seed light beam that propagates on the beam path and is amplified by the power amplifier.

Implementations may include one or more of the following features. The power amplifier may include a first power amplifier electrode; and a second power amplifier electrode separated from the first power amplifier electrode to form a power amplifier discharge region, the power amplifier discharge region configured to receive a gain medium including a noble gas and a halogen gas. At least one of the first power amplifier electrode and the second power amplifier electrode includes a metal alloy including more than 33% and less than 50% zinc by weight.

In another general aspect, an anode for a deep ultraviolet (DUV) light source includes a substrate of a metal alloy material including at least one metal component; and a surface on one side of the substrate. In operational use, the surface is positioned to face a cathode and a discharge region having a gain medium including a halogen gas, the metal component in the surface reacts with the halogen gas to form a layer of protective material on the surface, and the layer of protective material covers the entire surface after at least thirty billion occurrences of an electrical discharge between the anode and the cathode.

Implementations may include one or more of the following features. The layer of protective material may have a substantially uniform electrical conductivity after at least thirty billion occurrences of an electrical discharge between the anode and the cathode. The layer of protective material may have a substantially uniform thickness along a direction that is parallel to a normal of the surface. The at least one metal component of the substrate may include zinc. The metal component of the substrate may be more than 33% and less than 50% zinc by weight. The substrate and the surface may form a single, bulk structure of the metal alloy. The metal alloy may include a second metal component, the second metal component including copper. The metal alloy also may include nickel.

In another general aspect, a method of operating a discharge chamber of a deep ultraviolet light source includes applying a voltage to a discharge chamber that includes a first electrode and a second electrode, the voltage being sufficient to cause a population inversion in a gaseous gain medium including a halogen gas in a discharge region between the first electrode and the second electrode; allowing a metal component in the first electrode and/or the second electrode to react with the halogen gas to form a layer of protective material on a surface that faces the discharge region; and continuing to apply and remove the voltage such that the voltage sufficient to cause the population inversion is provide to the discharge chamber at temporal intervals and for a total of at least thirty billion applications of the voltage to produce a pulsed light beam.

In another general aspect, an electrode configured for use in an excimer laser source includes a metal alloy including more than 33% and less than 50% zinc by weight.

Implementations of any of the techniques described above and herein may include a process, an apparatus, an electrode, a photolithography system, a DUV light source, and/or a method. The details of one or more implementations are set forth in the accompanying drawings and the description below. Other features will be apparent from the description and drawings, and from the claims.

BRIEF DESCRIPTION OF THE DRAWINGS

FIG. 5A is a block diagram of an example of a photolithography system.

FIG. 5B is a block diagram of an example of a projection optical system that may be used in, for example, the photolithography system of FIG. 5A.

FIG. 8A is an amplitude of an example of a wafer exposure signal as a function of time.

FIG. 8B is an amplitude of an example of a gate signal as a function of time.

FIG. 8C is an amplitude of an example of a trigger signal as a function of time.

DETAILED DESCRIPTION

Figure 1:
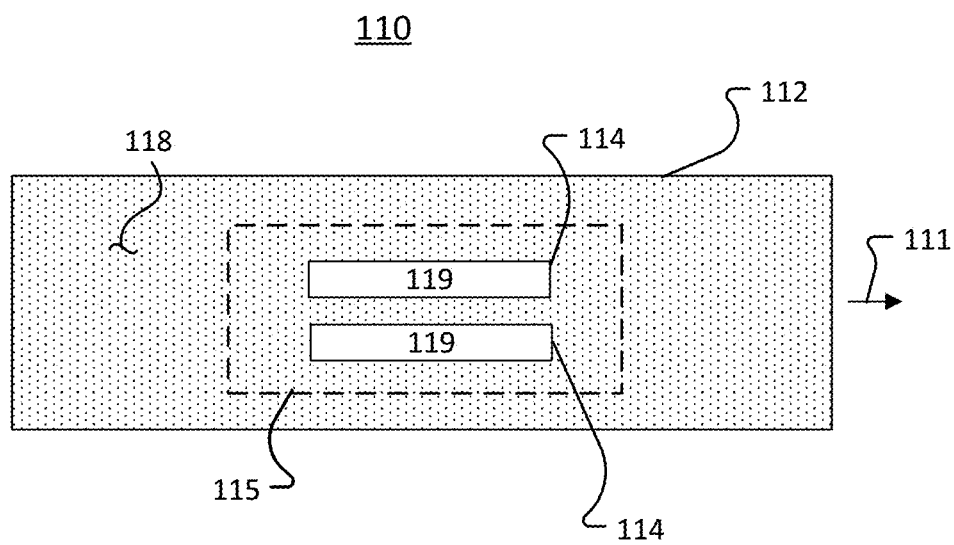
FIG. 1 is a block diagram of an example of a discharge chamber.
Figure 7:
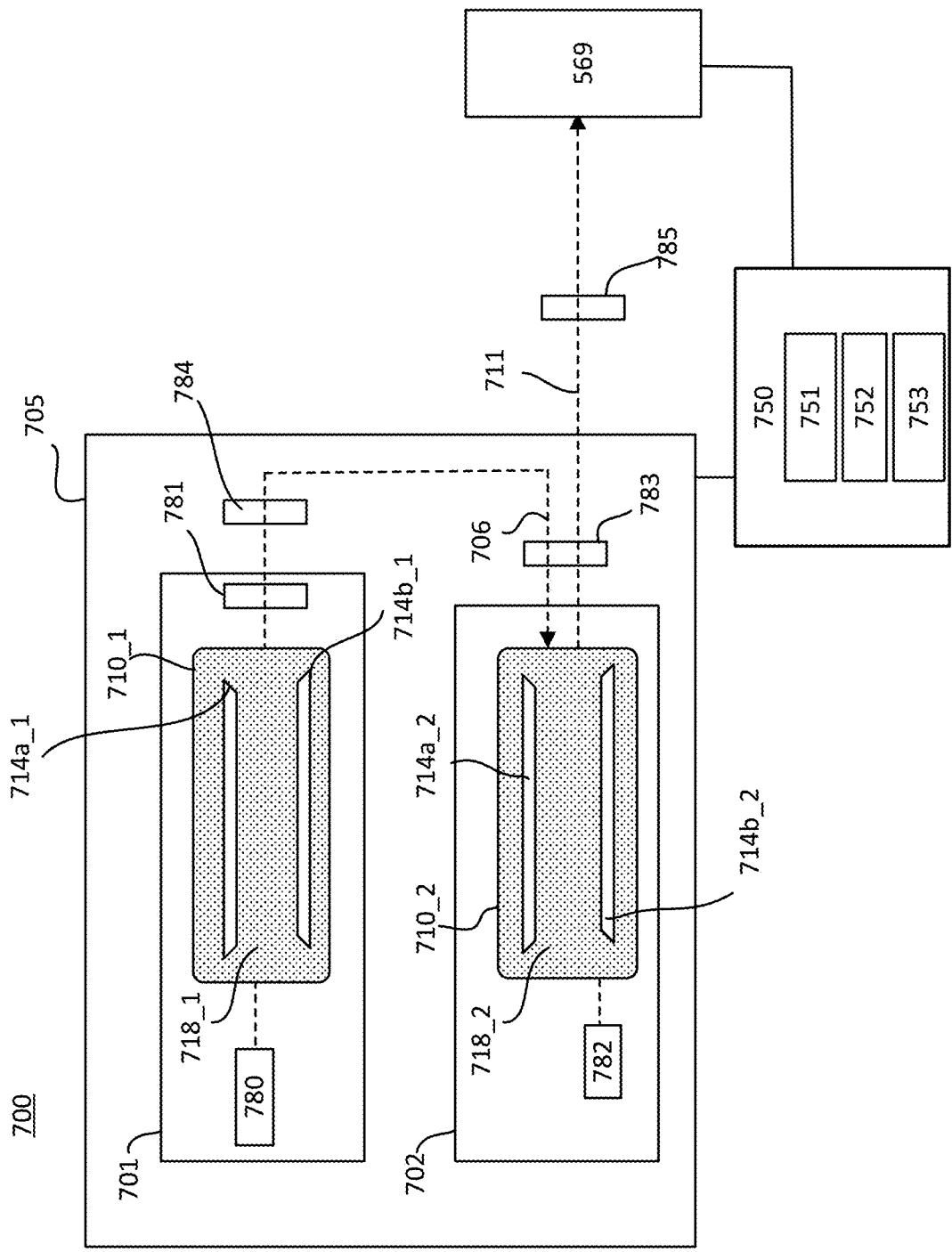
FIG. 7 is a block diagram of another example of a photolithography system.

Referring to FIG. 1, a block diagram of a discharge chamber 110 is shown. The discharge chamber 110 is an example of a discharge chamber that may be part of a deep ultraviolet (DUV) light source such as shown in FIGS. 5A and 7. The discharge chamber 110 includes an energy source 115 and a gas mixture 118 inside of a housing 112. The gas mixture 118 includes a gain medium formed from a noble gas and a halogen gas. The energy source 115 provides energy to the gas mixture 118 sufficient to cause a population inversion in the gain medium and to enable generation of an output light beam 111 via stimulated emission. The output light beam 111 may be provided to a photolithography system, such as shown in FIGS. 5A and 7, or to another discharge chamber. The energy source 115 may be controlled to provide energy to the gas mixture 118 at regular temporal intervals such that the light beam 111 is a pulsed light beam that includes a plurality of pulses of light separated from each other in time.

The energy source 115 includes electrodes 114, at least one of which includes a metal alloy 119. The electrodes 114 may be a pair of electrodes, with one being an anode and the other being a cathode. The chemical composition of the metal alloy 119 extends the life of the energy source 115 (and thus also the discharge chamber 110) as compared to discharge chambers that rely on electrodes made from metal alloys traditionally used in a discharge chamber of a DUV light source.

Details of the metal alloy 119 are discussed with respect to, for example, FIGS. 3, 4, 6A, and 6B. The operation of a discharge chamber of a DUV light source with an anode that is formed from a traditional material is discussed with respect to FIGS. 2A-2C.

Figure 2A:
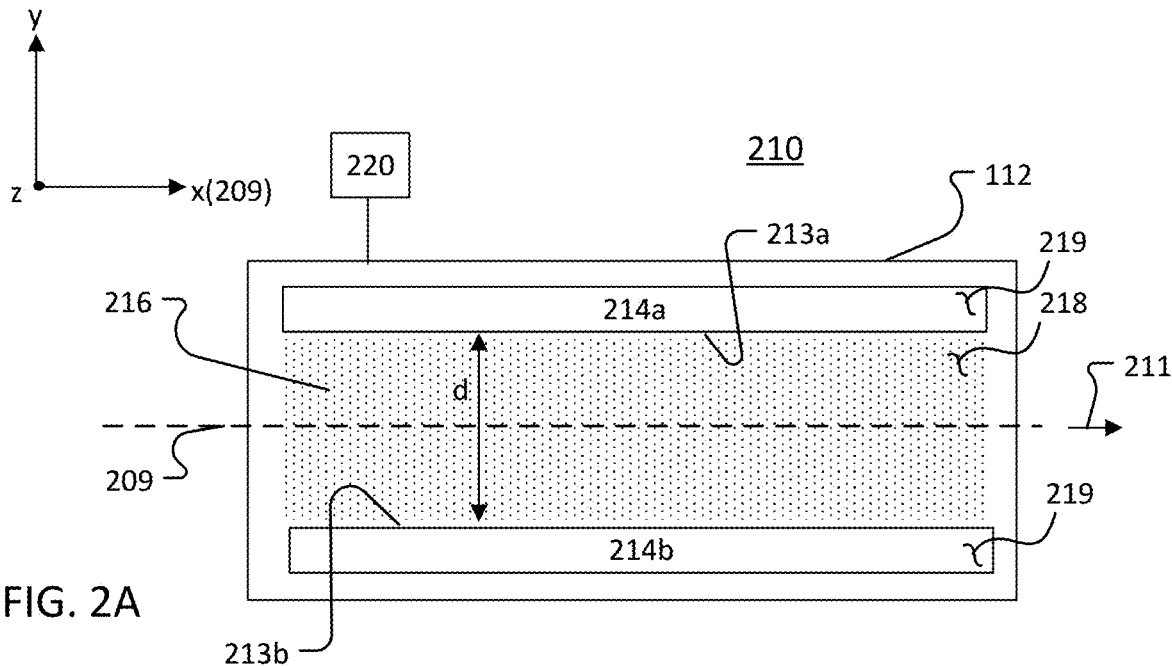
FIG. 2A is a block diagram is an example of a discharge chamber.

FIG. 2A is a side cross-sectional block diagram of a discharge chamber 210. The discharge chamber 210 is an example of an existing or known discharge chamber 210 that may be used in a DUV light source. The discharge chamber 210 includes a cathode 214a and an anode 214b. The cathode 214a and the anode 214b extend generally in the x-z plane along a longitudinal axis 209 of the discharge chamber 210. The electrodes 214a and 214b are made out of a traditional metal alloy 219. The traditional metal alloy 219 may be, for example, an alloy of copper and zinc, where the alloy 219 includes 30% zinc by weight or less than 30% zinc by weight.

The cathode 214a and the anode 214b are separated from each other along the y axis by a distance d, with a discharge region 216 between the cathode 214a and the anode 214b. The discharge region 216 includes a gas mixture 218, which is represented by a dotted pattern in FIG. 2A. The gas mixture 218 includes a gain medium formed from a noble gas and a halogen gas. The noble gas may be, for example, argon, krypton, and/or xenon. The halogen gas may be, for example, fluorine. The gas mixture 218 also may include a buffer gas.

A voltage source 220 is used to form a potential difference and electric field between the cathode 214a and the anode 214b. The potential difference is large enough to cause an electric discharge (a flow of electrons, electric charge, or current) in the gas mixture 218 and to ionize at least some of the halogen gas in the gas mixture 218. A "discharge event" is the application of voltage that forms the potential difference sufficient to cause an electrical discharge in the gas mixture 218. The electric field accelerates the electrons in the gain medium, and the electrons collide with neutral atoms in the gas mixture 218. The collisions cause electrons in the lower energy state to jump to a higher energy state, and a population inversion occurs in the gain medium such that an output light beam 211 may be generated through stimulated emission.

The ionization of the gas mixture 218 forms a halogen-containing plasma that includes halogen ions that react with the metal alloy 219. The ionized gas mixture 218 is also referred to as the reactive gas. A layer 213b forms on a surface of the anode 214b that faces the discharge region 216. The layer 213b contains the reaction products formed by the reaction of the metal alloy 219 and the reactive gas. The layer 213b forms after the first few discharge events. For example, the layer 213b may form after 10 or 100 discharge events.

The layer 213b is less conductive than the metal alloy 219. As compared to the metal alloy 219, the layer 213b is also less reactive with the halogen-containing plasma. Thus, the layer 213b acts as a passivation layer or a protective layer. In implementations in which the alloy 219 includes zinc and copper, and the gas mixture 218 includes fluorine, the fluorine ions react with zinc before reacting with copper (because zinc has more affinity to react with fluorine compared with copper). Thus, the protective layer 213b in these implementations is mainly zinc fluoride ($ZnF_2$), but also includes $CuF_2$. A protective layer 213a also forms on the cathode 214a.

Figure 2B:
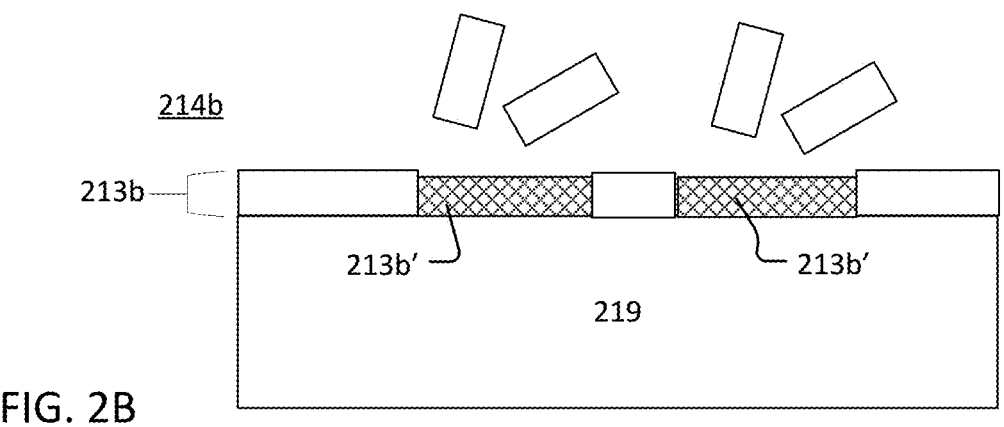
FIG. 2B is a block diagram of an anode of the discharge chamber of FIG. 2A during steady-state operation.

FIG. 2B shows a side block diagram of the anode 214b during steady-state operation of the discharge chamber 210. In steady-state operation, discharge events occur at regular temporal intervals to form pulses of light. The protective layer 213b may crack due to a discharge event, causing large regions of the underlying metal alloy 219 to become exposed. However, the surface of the exposed metal alloy 219 becomes re-coated with a new protective layer 213b' of mainly $ZnF_2$ such that substantially all of the surface of the electrode 214b that faces the discharge region 216 continues to be covered during steady-state operation, and the output of the discharge chamber 210 is not affected.

Figure 2C:
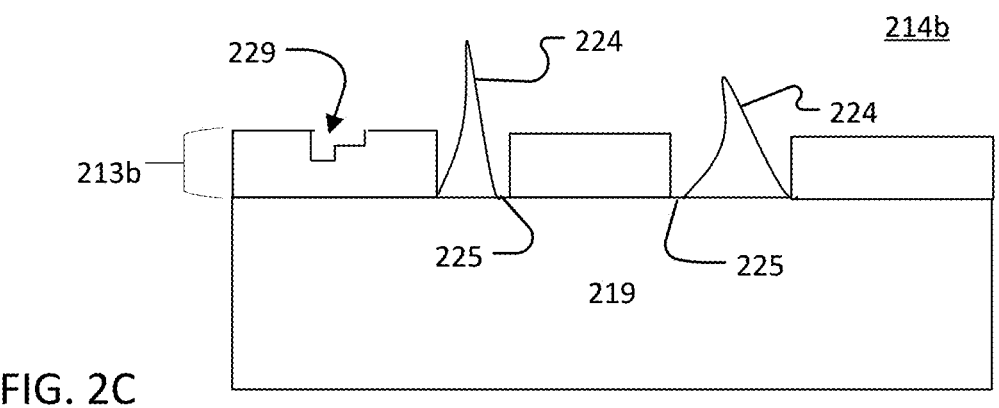
FIG. 2C is a block diagram of the anode of FIG. 2B after 20 billion discharge events.

Referring also to FIG. 2C, which is a side block diagram of the anode 214b, after many discharge events (for example, 20 billion), the protective layer 213b thickens along the y direction. The thickening may be caused by high current and/or high temperature at the protective layer 213b. The thickening of the protective layer 213b increases the mechanical stress on the protective layer 213b. Portions of the protective layer 213b begin to spall or flake off, exposing small regions (such as the region 225) of the uncoated metal alloy 219. Because the metal alloy 219 at the region 225 is very reactive compared to the neighboring layers 213b, the region 225 attracts the neighboring current so the temperature rises significantly at the region 225. The high local temperature at the region 225 increases the reaction of the metal alloy 219 and the reactive gas and thus corrosion layers begin to build up at a higher rate and corrosion products grow or accumulate on top of the protective layer 213b. The corrosion layers and the accumulated corrosion products resulting from this run-away corrosion process are labeled 224 in FIG. 2C and may be called "reefs." The reefs 224 are made from the same material as the protective layer 213b and may be considered to be localized areas of build-up of the products of corrosion caused by the halogen-containing plasma. The reefs 224 extend toward the cathode 214a and are made from the same material as the protective layer 213b.

The metal alloy 219 has a higher electrical conductivity than the protective layer 213b. Thus, the small exposed regions 225 attract the arc formed during a discharge event more strongly than protective layer 213b, resulting in a non-uniform electric field and arcing in the discharge region 216. Arcing is undesirable because the arc can absorb energy from the gain medium that would otherwise be used to form the light beam 211. The deterioration of the protective layer 213b accelerates, and the protective layer 213b becomes spatially and electrically non-uniform such that the beam 211 cannot be produced reliably. When the beam 211 cannot be reliably produced, the discharge chamber 210 is not able to function properly and has reached the end of its lifespan. Thus, the formation of the reefs 224 shortens the life of the discharge chamber 210. The discharge chamber 210, which includes the cathode 214a and the anode 214b made from the traditional metal alloy 219, begins to develop reefs after about 18 billion discharge events and has a lifetime of about 30 billion discharge events or less.

Figure 3:
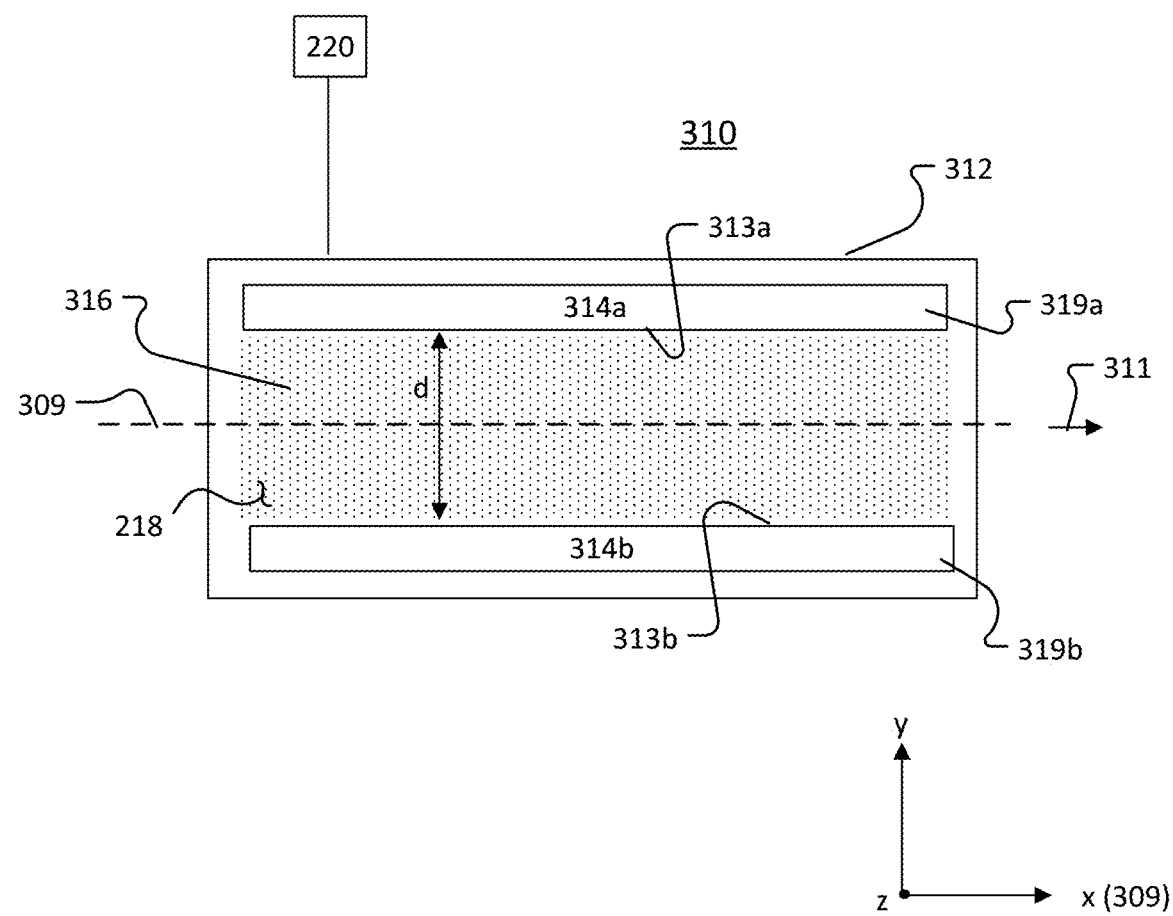
FIG. 3 is a block diagram of another example of a discharge chamber.

Referring to FIG. 3, a side cross-sectional block diagram of a discharge chamber 310 is shown. The discharge chamber 310 is an example of a discharge chamber that may be part of a deep ultraviolet (DUV) light source such as shown in FIGS. 5A and 7. The discharge chamber 310 includes electrodes 314a, 314b in a housing 312. In the example of FIG. 3, the electrode 314a is a cathode and the electrode 314b is an anode. The anode 314b includes a metal alloy 319b. The chemical composition of the metal alloy 319b results in a more robust protective layer, thereby extending the life of the discharge chamber 310 as compared to the discharge chamber 210.

The cathode 314a and the anode 314b extend generally in the x-z plane and along a direction parallel to a longitudinal axis 309 of the discharge chamber 310. The cathode 314a is separated from the anode 314b along the y axis by a distance d, and a discharge region 316 is between the cathode 314a and the anode 314b. The discharge region 316 includes the gas mixture 218.

The ionization of the gas mixture 218 forms a halogen-containing plasma that includes halogen ions, which react with the metal alloy 319b. The reaction between the metal alloy 319 and the halogen ions forms a protective layer 313b on a surface of the electrode 314b that faces the discharge region 316.

The metal alloy 319b has a chemical composition that results in the protective layer 313b being more robust than the protective layer 219b discussed with respect to FIGS. 2A-2C. For example, as compared to the protective layer 219b, the protective layer 313b is more strongly adhered to the bulk metal alloy 319b such that the protective layer 313b does not crack as easily as the protective layer 219b. As a result, exposure of the underlying bulk metal alloy 319b is reduced or eliminated. Additionally, the layer 313b may remain spatially and/or electrically uniform for a greater number of discharge events than an electrode made of a metal alloy traditionally used in a discharge chamber of a DUV light source. The protective layer 313b may cover substantially all of the portion of the electrode 314b that faces the discharge region 316 and/or may have a uniform conductivity even after 30-60 billion discharge events. In contrast, a protective layer formed by an electrode made of a traditional metal alloy generally cracks and has a non-uniform conductivity after about 20 billion discharge events. Using the metal alloy 319b thus increases the number of discharge events that the electrode 314b is able to withstand and thus also increases the lifetime of the discharge chamber 310.

The metal alloy 319b may be, for example, an alloy of copper and zinc that includes 33% to 50% zinc by weight, 33.5% zinc to 40% zinc by weight, 35% to 50% zinc by weight, 37% to 50% zinc by weight, 40% to 50% zinc by weight, or 33% to 45% zinc by weight. The metal alloy 319b may be, for example, 33.5% zinc by weight, 37% zinc by weight, or 45% zinc by weight. In some implementations, the metal alloy 319b also includes nickel.

Additionally or alternatively, the cathode 314a may include a metal alloy 319a that has a chemical composition that is different from the traditional metal alloy 219 discussed with respect to FIGS. 2A-2C. The metal alloy 319a may be, for example, an alloy of copper and zinc that includes between 33% and 40% zinc by weight.

These compositions are in contrast to the typical metal alloys used for electrodes in a discharge chamber of a DUV light source, such as the alloy 219 discussed with respect to FIGS. 2A-2C. Typical metal alloys for an electrode in a DUV discharge chamber include alloys of copper and zinc, but with lower percentages of zinc by weight than the metal alloy 319b. For example, a typical anode used in a discharge chamber of a DUV light source may be made of an alloy of copper and zinc, with the zinc being 30% by weight. The applicant discovered that increasing the amount of zinc by weight produces an electrode that supports a more robust protective layer. Zinc reacts with fluorine more readily than copper reacts with a halogen gas. For example, the protective layer formed from an alloy of copper and zinc in the presence of ionized fluorine is zinc fluoride. It is believed that increasing the percentage of zinc in the metal alloy results in more zinc being exposed to the halogen-containing plasma that forms in the discharge region 316. Consequently, more zinc fluoride is formed, and the protective layer 313b is more robust. However, zinc has a relatively high vapor pressure, and metal alloys having more than about 50% zinc by weight evaporate readily and do not form the more robust protective layer. As such, the metal alloy 319b has a zinc content that is greater than the zinc content of a traditional electrode, but the metal alloy 319b does not have such a high concentration of zinc that evaporation dominates over the formation of the protective layer.

Figure 4C:
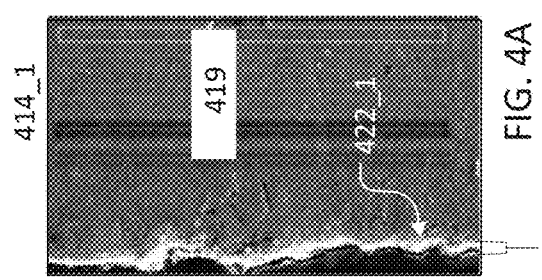
FIGS. 4A-4C are photographs of example electrodes.
Figure 4F:
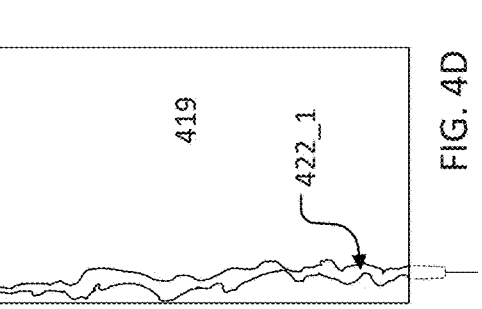
FIGS. 4D-4F are line drawing illustrations corresponding to the electrodes of FIGS. 4A-4C, respectively.
Figure 4B:
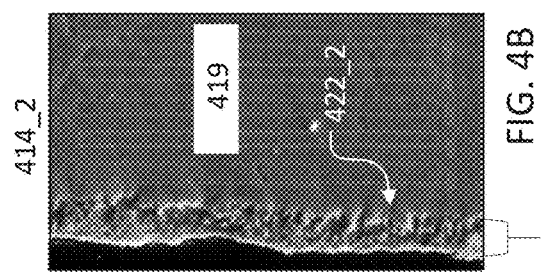
Figure 4E:
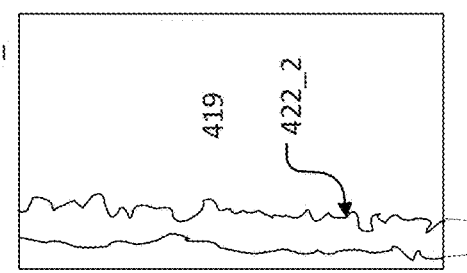
Figure 4A:
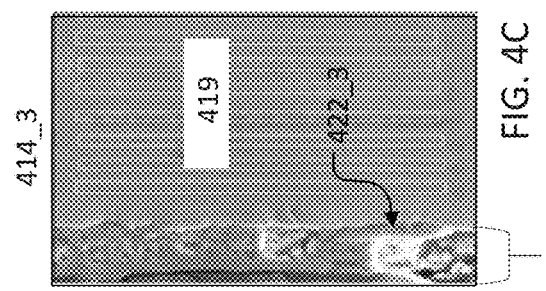
Figure 4D:
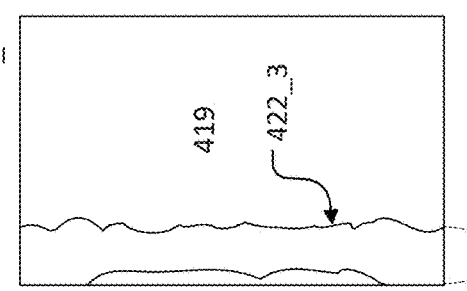

Referring also to FIGS. 4A-4C, scanning electron microscope photographs of protective layers 413_1, 413_2, and 413_3 that formed on electrodes 414_1, 414_2, and 414_3, respectively, are shown. The protective layers 413_1, 413_2, 413_3 form on a bulk substrate 419 of the electrodes 414_1, 414_2, 414_3 at boundaries 422_1, 422_2, 422_3, respectively. FIG. 4D is an approximate line drawing of the electrode 414_1. FIG. 4E is an approximate line drawing of the electrode 414_2. FIG. 4F is an approximate line drawing of the electrode 414_3.

The electrode 414_1 was formed from a metal alloy that includes zinc and copper, with 5% zinc by weight. The electrode 414_2 was formed from a metal alloy that includes zinc and copper, with 30% zinc by weight. The electrode 414_3 was formed from a metal alloy that includes zinc and copper, with 45% zinc by weight. Each electrode 414_1, 414_2, 414_3 was exposed to ionized fluorine gas at a temperature of 450° C. for two hours. The temperature of 450° C. is believed to be approximately the same as a surface temperature of an electrode in a discharge chamber during the actual chamber operation because the thickness of the protective layer formed on the electrodes 414_1, 414_2, 414_3 is close to the thickness of a protective layer formed on an electrode used in a discharge chamber.

As shown in the photographs, the protective layer 413_3 is more spatially uniform than the protective layers 413_1 and 413_2. The protective layer 413_3 is also more dense and more securely bonded to the underlying bulk metal alloy than the protective layers 413_1 and 413_2. The appearance of the protective layer 413_3 indicates that it is more robust than the protective layers 413_1 and 413_2, which formed on the electrodes 414_1 and 414_3, respectively.

FIGS. 5A and 7 provide examples of DUV light sources in which an electrode including a metal alloy such as the alloy 119 or 319b may be used.

Referring to FIGS. 5A and 5B, a photolithography system 500 includes an optical (or light) source 505 that provides a light beam 511 to a lithography exposure apparatus 569, which processes a wafer 570 received by a wafer holder or stage 571. The light source 505 includes a discharge chamber 510, which encloses a cathode 514a and an anode 514b. Only one gas discharge chamber 510 is shown in FIG. 5A; however, the light source 505 may include more than one discharge chamber.

The light beam 511 is a pulsed light beam that includes pulses of light separated from each other in time. The lithography exposure apparatus 569 includes a projection optical system 575 through which the light beam 511 passes prior to reaching the wafer 570, and a metrology system 572. The metrology system 572 may include, for example, a camera or other device that is able to capture an image of the wafer 570 and/or the light beam 511 at the wafer 570, or an optical detector that is able to capture data that describes characteristics of the light beam 511, such as intensity of the light beam 511 at the wafer 570 in the x-y plane. The lithography exposure apparatus 569 can be a liquid immersion system or a dry system. The photolithography system 500 also includes a control system 550 to control the light source 505 and/or the lithography exposure apparatus 569.

Microelectronic features are formed on the wafer 570 by, for example, exposing a layer of radiation-sensitive photoresist material on the wafer 570 with the light beam 511. Referring also to FIG. 5B, the projection optical system 575 includes a slit 576, a mask 574, and a projection objective, which includes a lens system 577. The lens system 577 includes one or more optical elements. The light beam 511 enters the optical system 575 and impinges on the slit 576, and at least some of the beam 511 passes through the slit 576. In the example of FIGS. 5A and 5B, the slit 576 is rectangular and shapes the light beam 511 into an elongated rectangular shaped light beam. A pattern is formed on the mask 574, and the pattern determines which portions of the shaped light beam are transmitted by the mask 574 and which are blocked by the mask 574. The design of the pattern is determined by the specific microelectronic circuit design that is to be formed on the wafer 570.

The cathode 514a and/or the anode 514b includes a metal alloy that has a composition that forms a more robust protective layer as compared to a metal alloy traditionally used in a discharge chamber of a DUV light source. For example, the anode 514b may for example, an alloy of copper and zinc that includes 33% to 50% zinc by weight, 33.5% zinc to 40% zinc by weight, 35% to 50% zinc by weight, 37% to 50% zinc by weight, 40% to 50% zinc by weight, or 33% to 45% zinc by weight. The metal alloy used in the anode 514b may be, for example, 33.5% zinc by weight, 37% zinc by weight, or 45% zinc by weight. Moreover, it is contemplated that for various applications suitable electrode compositions may include approximately 31%, 32%, 33%, 34%, 35%, 36%, 37%, 38%, 40%, 42%, 44%, 46%, 48%, or 50% zinc, or any ranges there between (for example, 33%-38%).

In some implementations, only the anode uses the metal alloy that has the increased zinc content. In other implementations, both the cathode 514a and the anode 514b include a metal alloy that has a greater amount of zinc by weight than a metal alloy traditionally used in a DUV light source discharge chamber. Increasing the amount of zinc in the cathode 514a decreases the material loss rate of the cathode 514a. However, increasing the amount of zinc in the cathode 514a also increases the material loss rate of the anode 514b. Thus, to achieve optimal performance of the discharge chamber 510, the amount of zinc in the metal alloys used for the cathode 514a and the anode 514b may be different from the amounts that would be expected to result in the minimum material loss rate.

Figure 6B:
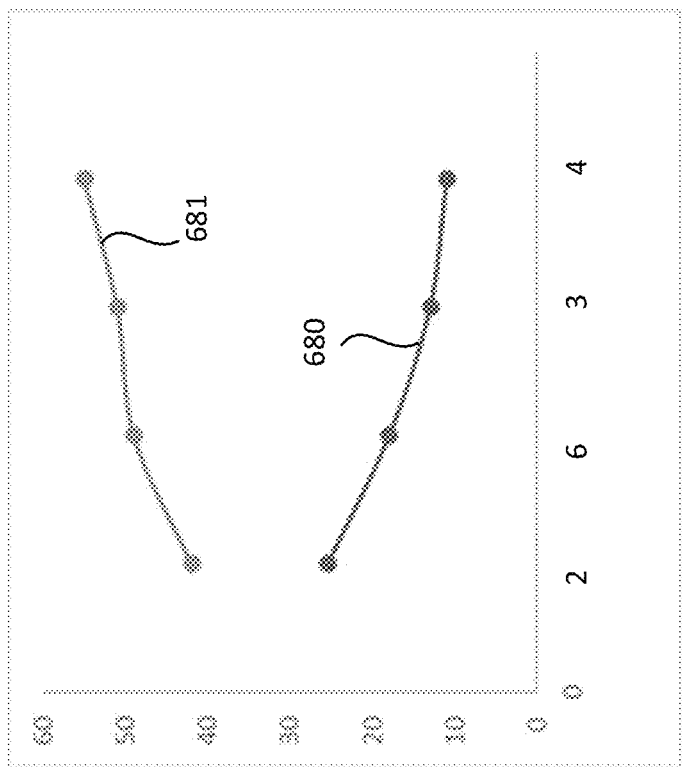
FIGS. 6A and 6B relate to example experimental results for material loss for metal alloys having different amounts of zinc by weight.
Figure 6A:
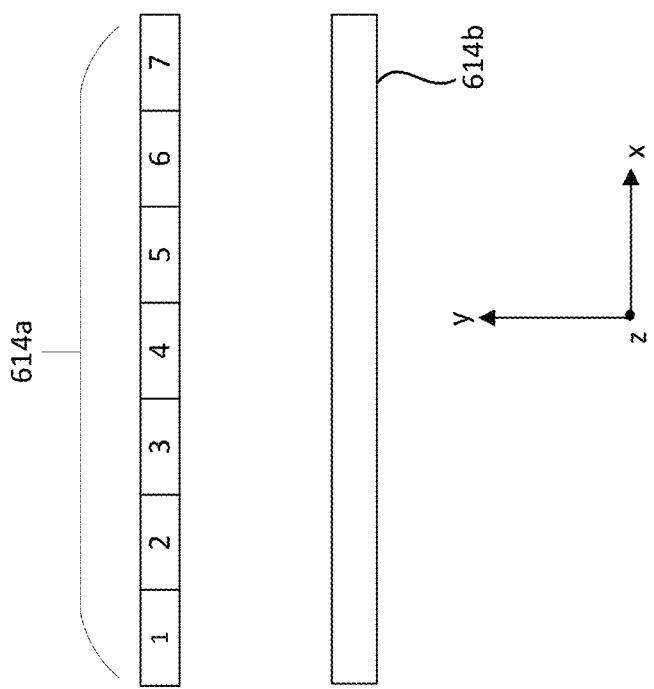

FIGS. 6A and 6B, discuss experimental results related to material loss rate for segments of metal alloys that include different amounts of zinc after being exposed to ionized fluorine gas. The material loss rate provides a measurement of an amount of material lost from a segment along the y axis due to exposure to the ionized fluorine gas. A greater amount of material loss indicates that a segment includes a metal alloy is more reactive.

FIG. 6A is a side block diagram of a cathode 614a and an anode 614b. The cathode 614a and the anode 614b are parallel to each other and extend along the x axis. The cathode 614a includes segments 1-7. The segments 1-7 make physical contact with each other and extend along the x axis. The anode 614b includes a metal alloy of copper and zinc, with the zinc being 37% of the metal alloy by weight. The segments 1-7 were also a metal alloy of copper and zinc. To assess the effect of zinc content of the cathode, the amount of zinc in each of the segments 1-7 was varied. The segments 2 and 5 included 15% zinc by weight, the segment 3 included 33.5% zinc by weight, the segment 4 included 37% zinc by weight, and the segments 1, 6, and 7 included 30% zinc by weight. The amount of zinc in the anode 614b was 37% throughout the anode 614b.

The amount of erosion or material loss was measured after 10.035 billion discharge events (or produced pulses). An electrode scanner was used to measure the height profiles of the segments 1-7. The height of the segments 1-7 is the extent along they axis. For each segment, the height profile was measured at two or more locations along the x axis. The measured heights of a segment were averaged, and the average was used as the measured height of that segment. The material loss was determined from the original height of a segment and the measured height of the segment after exposure to the ionized fluorine gas.

FIG. 6B shows the measured material loss rate in microns (μm) per billion pulses (BP) for cathode segments 2-4 and 6 and the anode 614b. In FIG. 6B, the material loss rate is plotted as a function of the segment identifier. A plot 680 represents the material loss rate for the cathode 614a, and a plot 681 represents the material loss rate for the anode 614b.

The material loss rate for the anode 614b for a particular cathode segment is the material loss rate measured for the portion of the anode 614b that is aligned in the y axis with a cathode segment. Although the anode 614b has a constant amount of zinc along the x axis, the material loss rate of the anode 614b varies with the changes in zinc content of the segments 1-7. The cathode material loss rate for segment 2 (15% zinc by weight) was 27 μm/BP, and the anode material loss rate was 43 μm/BP. The cathode material loss rate for segment 6 (30% zinc by weight) was 18 μm/BP, and the anode material loss rate was 49 μm/BP. The cathode material loss rate for segment 3 (33.5% zinc by weight) was 13 μm/BP, and the anode erosion rate was 51 μm/BP. The cathode erosion rate for segment 4 (37% zinc by weight) was 11 μm/BP, and the anode erosion rate was 55 μm/BP.

Thus, the cathode material loss rate decreased as the amount of zinc in the cathode 614a increased. Decreasing the material loss rate is generally beneficial and leads to a longer discharge chamber lifetime. However, increasing the amount of zinc in the cathode also caused the material loss rate of the anode 614b to increase. As such, in some implementations in which the anode and the cathode both include a metal alloy that has a higher amount of zinc by weight than a metal alloy traditionally used in a discharge chamber of a DUV light source, the amount of zinc in the cathode may be less than the amount of zinc in the anode to strike a balance between erosion of the cathode and erosion of the anode. For example and referring again to FIG. 5A, the anode 514b may be made from a metal alloy that includes copper and zinc, with 33% to 50% zinc by weight, and the cathode 514a may be made from a metal alloy that includes copper and zinc, with 33% to 40% zinc by weight.

In some implementations, the anode 514b may be made from a metal alloy that includes copper and zinc, with 37% zinc by weight, and the cathode 514a may be made from a metal alloy that includes copper and zinc, with 33% zinc by weight.

The amount of material loss for two segments having the same amount of zinc but located in different portions of the discharge chamber may be different due to non-uniformities in the discharge chamber. For example, the segment 2 and the segment 5 both include a metal alloy of copper and zinc, with 15% zinc by weight. The material loss rate for segment 2 was 27 μm/BP, and the material loss rate for segment 5 was 24 μm/BP. However, the difference in material loss rate due to location was observed to be less significant than the differences in material loss rate due to zinc content and does not change the conclusions regarding the effect of zinc content on material loss rate.

Referring to FIG. 7, a block diagram of a photolithography system 700 is shown. The system 700 is an example of an implementation of the system 500 (FIG. 5A). For example, in the photolithography system 700, an optical source 705 is used as the optical source 505 (FIG. 5A). The optical source 705 produces a pulsed light beam 711, which is provided to the lithography exposure apparatus 569. The photolithography system 700 also includes a control system 750, which, in the example of FIG. 7, is connected to components of the optical source 705 as well as to the lithography exposure apparatus 569 to control various operations of the system 700. In other implementations, the control system 750 may be implemented as two separate control systems, one to control various aspects of the optical source 705 and another to control the lithography exposure apparatus.

In the example shown in FIG. 7, the optical source 705 is a two-stage laser system that includes a master oscillator (MO) 701 that provides a seed light beam 706 to a power amplifier (PA) 702. The MO 701 and the PA 702 may be considered to be subsystems of the optical source 705 or systems that are part of the optical source 705. The power amplifier 702 receives the seed light beam 706 from the master oscillator 701 and amplifies the seed light beam 706 to generate the light beam 711 for use in the lithography exposure apparatus 569. For example, the master oscillator 701 may emit a pulsed seed light beam, with seed pulse energies of approximately 1 milliJoule (mJ) per pulse, and these seed pulses may be amplified by the power amplifier 702 to about 10 to 15 mJ.

The master oscillator 701 includes a discharge chamber 710_1 having two elongated electrodes 714a_1 and 714b_1, a gain medium 718_1 that is a gas mixture, and a fan (not shown) for circulating the gas mixture between the electrodes 714a_1, 714b_1. The electrode 714a_1 and/or the electrode 714b_1 is made from a metal alloy that includes copper and zinc and has a higher concentration of zinc by weight than a metal alloy typically used in a discharge chamber of a DUV master oscillator. In the example shown, the electrode 714a_1 is a cathode, and the electrode 714b_1 is an anode. The cathode 714a_1 may contain 33% to 40% zinc by weight, and the anode 714b_1 may contain 33% to 50% zinc by weight.

A resonator is formed between a line narrowing module 780 on one side of the discharge chamber 710_1 and an output coupler 781 on a second side of the discharge chamber 710_1. The line narrowing module 780 may include a diffractive optic such as a grating that finely tunes the spectral output of the discharge chamber 710_1. The optical source 705 also includes a line center analysis module 784 that receives an output light beam from the output coupler 781 and a beam coupling optical system 738. The line center analysis module 784 is a measurement system that may be used to measure or monitor the wavelength of the seed light beam 706. The line center analysis module 784 may be placed at other locations in the optical source 705, or it may be placed at the output of the optical source 705.

The gas mixture 718_1 may be any gas suitable for producing a light beam at the wavelength and bandwidth required for the application. For an excimer source, the gas mixture may contain a noble gas (rare gas) such as, for example, argon or krypton, a halogen, such as, for example, fluorine or chlorine and traces of xenon apart from a buffer gas, such as helium. Specific examples of the gas mixture include argon fluoride (ArF), which emits light at a wavelength of about 193 nm, krypton fluoride (KrF), which emits light at a wavelength of about 248 nm, or xenon chloride (XeCl), which emits light at a wavelength of about 351 nm. The excimer gain medium (the gas mixture) is pumped with short (for example, nanosecond) current pulses in a high-voltage electric discharge by application of a voltage to the elongated electrodes 714a_1, 714b_1.

The power amplifier 702 includes a beam coupling optical system 783 that receives the seed light beam 706 from the master oscillator 701 and directs the light beam 706 through a discharge chamber 710_2, and to a beam turning optical element 782, which modifies or changes the direction of the seed light beam 706 so that it is sent back into the discharge chamber 710_2. The beam turning optical element and the beam coupling optical system 783 form a circulating and closed loop path in which the input into a ring amplifier intersects the output of the ring amplifier at the beam coupling apparatus 783.

The discharge chamber 710_2 includes a pair of elongated electrodes 714a_2, 714b_2, a gas mixture 718_2, and a fan (not shown) for circulating the gas mixture 718_2 between the electrodes 714a_2, 714b_2. The gas mixture 718_2 may be the same as the gas mixture 718_1. The electrode 714a_2 and/or the electrode 714b_2 is made from a metal alloy that includes copper and zinc and has a higher concentration of zinc by weight than a metal alloy typically used in a discharge chamber of a DUV master oscillator. In the example shown, the electrode 714a_2 is a cathode, and the electrode 714b_2 is an anode. The cathode 714a_2 may contain 33% to 40% zinc by weight, and the anode 714b_2 may contain 33% to 50% zinc by weight.

The output light beam 711 may be directed through a beam preparation system 785 prior to reaching the lithography exposure apparatus 569. The beam preparation system 785 may include a bandwidth analysis module that measures various parameters (such as the bandwidth or the wavelength) of the beam 711. The beam preparation system 785 also may include a pulse stretcher (not shown) that stretches each pulse of the output light beam 711 in time. The beam preparation system 785 also may include other components that are able to act upon the beam 711 such as, for example, reflective and/or refractive optical elements (such as, for example, lenses and mirrors), filters, and optical apertures (including automated shutters).

The photolithography system 700 also includes the control system 750. The control system 750 may control when the optical source 705 emits a pulse of light or a burst of light pulses that includes one or more pulses of light by sending one or more signals to the optical source 705. The control system 750 is also connected to the lithography exposure apparatus 569. Thus, the control system 750 also may control the various aspects of the lithography exposure apparatus 569. For example, the control system 750 may control the exposure of the wafer 570 (FIG. 5B) and thus may be used to control how electronic features are printed on the wafer 570. In some implementations, the control system 750 may control the scanning of the wafer 570 by controlling the motion of the slit 576 in the x-y plane (FIG. 5B). Moreover, the control system 750 may exchange data with the metrology system 572 and/or the optical system 575 (FIG. 5B).

The lithography exposure apparatus 569 also may include, for example, temperature control devices (such as air conditioning devices and/or heating devices), and/or power supplies for the various electrical components. The control system 750 also may control these components. In some implementations, the control system 750 is implemented to include more than one sub-control system, with at least one sub-control system (a lithography controller) dedicated to controlling aspects of the lithography exposure apparatus 569. In these implementations, the control system 750 may be used to control aspects of the lithography exposure apparatus 569 instead of, or in addition to, using the lithography controller.

The control system 750 includes an electronic processor 751, an electronic storage 752, and an I/O interface 753. The electronic processor 751 includes one or more processors suitable for the execution of a computer program such as a general or special purpose microprocessor, and any one or more processors of any kind of digital computer. Generally, an electronic processor receives instructions and data from a read-only memory, a random access memory, or both. The electronic processor 751 may be any type of electronic processor.

The electronic storage 752 may be volatile memory, such as RAM, or non-volatile memory. In some implementations, and the electronic storage 752 includes non-volatile and volatile portions or components. The electronic storage 752 may store data and information that is used in the operation of the control system 750, components of the control system 750, and/or systems controlled by the control system 750. The information may be stored in, for example, a look-up table or a database.

The electronic storage 752 also may store instructions, perhaps as a computer program, that, when executed, cause the processor 751 to communicate with components in the control system 750, the optical system 705, and/or the lithography exposure apparatus 569.

The I/O interface 753 is any kind of electronic interface that allows the control system 750 to receive and/or provide data and signals with an operator, the optical system 705, the lithography exposure apparatus 569, any component or system within the optical system 705 and/or the lithography exposure apparatus 569, and/or an automated process running on another electronic device. For example, the I/O interface 753 may include one or more of a visual display, a keyboard, and a communications interface.

FIGS. 8A-8C provide an overview of the production of pulses and bursts in the optical source 705. The light beam 711 is a pulsed light beams and may include one or more bursts of pulses that are separated from each other in time. Each burst may include one or more pulses of light. In some implementations, a burst includes hundreds of pulses, for example, 100-400 pulses. FIG. 8A shows an amplitude of a wafer exposure signal 800 as a function of time, FIG. 8B shows an amplitude of a gate signal 815 as a function of time, and FIG. 8C shows an amplitude of a trigger signal as a function of time.

The control system 850 may be configured to send the wafer exposure signal 800 to the optical source 705 to control the optical source 705 to produce the light beam 711. In the example shown in FIG. 7A, the wafer exposure signal 800 has a high value 805 (for example, 1) for a period of time 807 during which the optical source 705 produces bursts of pulses of light. The wafer exposure signal 800 otherwise has a low value 810 (for example, 0) when the wafer 570 is not being exposed.

Referring to FIG. 8B, the light beam 711 is a pulsed light beam, and the light beam 711 includes bursts of pulses. The control system 750 also controls the duration and frequency of the bursts of pulses by sending a gate signal 815 to the optical source 705. The gate signal 815 has a high value 820 (for example, 1) during a burst of pulses and a low value 825 (for example, 0) during the time between successive bursts. In the example shown, the duration of time at which the gate signal 815 has the high value is also the duration of a burst 816. The bursts are separated in time by an inter-burst time interval. During the inter-burst time interval, the lithography exposure apparatus 569 may position the next die on the wafer 570 for exposure.

Referring to FIG. 8C, the control system 750 also controls the repetition rate of the pulses within each burst with a trigger signal 830. The trigger signal 830 includes triggers 840, one of which is provided to the optical source 705 to cause the optical source 705 to produce a pulse of light. The control system 750 may send a trigger 840 to the source 705 each time a pulse is to be produced. Thus, the repetition rate of the pulses produced by the optical source 705 (the time between two successive pulses) may be set by the trigger signal 830.

When the gain medium of the gas mixture 718_1 or the gas mixture 718_2 is pumped by applying voltage to the electrodes 714a_1, 714b_1 or 714a_2, 714b_2, respectively, the gain medium of the gas mixture emits light. As discussed above, the application of such a voltage is a discharge event. When voltage is applied to the electrodes at regular temporal intervals, the light beam 711 is pulsed. Thus, the repetition rate of the pulsed light beam 711 is determined by the rate at which voltage is applied to the electrodes. The trigger signal 830, for example, may be used to control the application of voltage to the electrodes and the repetition rate of the pulses, which may range between about 500 and 6,000 Hz for most applications. In some implementations, the repetition rate may be greater than 6,000 Hz, and may be, for example, 12,000 Hz or greater.

Figure 9:
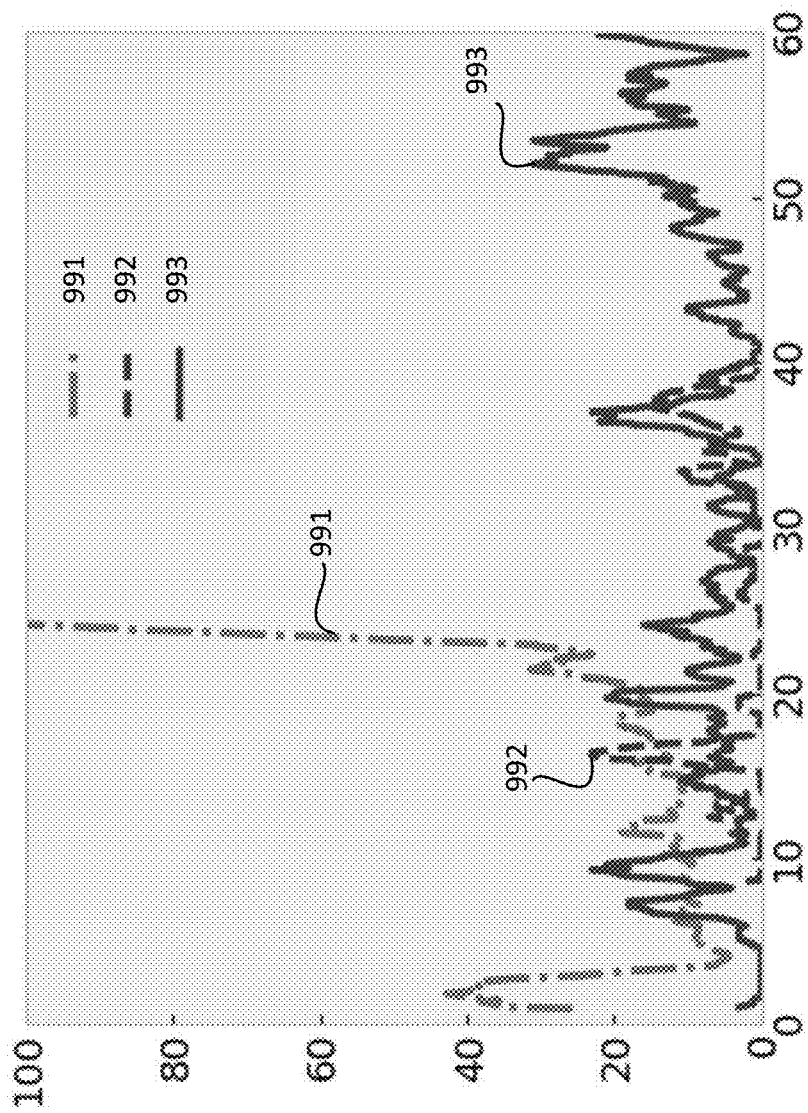
FIG. 9 are examples of measured beam quality (BQ) rate as a function of a number of discharge events.

FIG. 9 is a plot that shows measured master oscillator beam quality (BQ) rate as a function of generated pulses or discharge events. The data for FIG. 9 was obtained from a master oscillator such as the MO 701 of FIG. 7. The BQ rate indicates how many beam quality events have occurred in the optical source 705. A beam quality event occurs when any aspect of the seed light beam 706 or the beam 711 does not meet a pre-defined specification. For example, a beam quality event occurs when the beam 706 or 711 has an optical energy, spectral bandwidth, and/or wavelength outside of an accepted range of values. The BQ rate of FIG. 9 is the number of beam quality events (or a BQ count) per billion generated pulses or discharge events. In the example of FIG. 9, an upper limit of acceptable BQ rate for the MO 701 was 50.

In the example of FIG. 9, a plot 991 (dash-dot line) represents BQ rate (BQ count per billion pulses) for a system in which the electrodes 714a_1 and 714b_1 of the MO 701 were made from a traditional alloy of copper and zinc, with the amount of zinc being 30% by weight. A plot 992 (dashed line) represents BQ rate for a system in which the anode 714b_1 was made from an alloy of copper and zinc, with the amount of zinc being 33.5% by weight. A plot 993 (solid line) represents BQ rate for a system in which the anode 714b_1 was made from an alloy of copper and zinc, with the amount of zinc being 37% by weight.

As shown by comparing the plots 992 and 993 to the plot 991, increasing the zinc content of the electrode 714b_1 allows the MO 701 to produce many more pulses of the seed light beam 706 without exceeding the upper BQ rate limit. For example, the system with the anode made from the traditional alloy exceeds the upper BQ rate limit around 22 BP. The system with the anodes having 33.5% zinc and 37% zinc by weight had lower beam quality rates up to and greater than 40 BP. The electrode having 33.5% zinc formed reefs at around 35 BP, and the electrode having 37% zinc had not formed reefs at 50 BP. Thus, increasing the amount of zinc in the electrodes of the discharge chamber improved performance of the MO 701 as compared to using the traditional metal alloy.

The embodiments may further be described using the following clauses:

1. A discharge chamber for a deep ultraviolet (DUV) light source, the discharge chamber comprising:
   a housing; and
   a first electrode and a second electrode in the housing, the first electrode and the second electrode being separated from each other to form a discharge region between the first electrode and the second electrode, the discharge region being configured to receive a gain medium comprising at least one noble gas and a halogen gas, wherein
   at least one of the first electrode and the second electrode comprises a metal alloy comprising more than 33% and less than 50% zinc by weight.

2. The discharge chamber of clause 1, wherein the first electrode is a cathode and the second electrode is an anode, and the second electrode comprises the metal alloy comprising more than 33% and less than 50% zinc by weight.

3. The discharge chamber of clause 2, wherein the metal alloy further comprises copper.

4. The discharge chamber of clause 3, wherein the halogen gas comprises fluorine.

5. The discharge chamber of clause 4, wherein the noble gas comprises argon, krypton, neon, and/or xenon.

6. The discharge chamber of clause 5, wherein the metal alloy of the second electrode comprises between 35% and 50% zinc by weight.

7. The discharge chamber of clause 5, wherein the metal alloy of the second electrode comprises between 37% and 50% zinc by weight.

8. The discharge chamber of clause 5, wherein the metal alloy of the second electrode comprises between 40% and 50% zinc by weight.

9. The discharge chamber of clause 5, wherein the metal alloy of the second electrode comprises more than 33% and less than 45% zinc by weight.

10. The discharge chamber of clause 2, wherein the first electrode comprises more than 33% and less than 40% zinc by weight, and the second electrode comprises more than 33% and less than 50% zinc by weight.

11. A deep ultraviolet (DUV) light source comprising:
   a master oscillator comprising a first master oscillator electrode and a second master oscillator electrode, the first master oscillator electrode and the second master oscillator electrode being separated from each other to form a master oscillator discharge region, the master oscillator discharge region configured to receive a gain medium comprising a noble gas and a halogen gas, wherein at least one of the first master oscillator electrode and the second master oscillator electrode comprise a metal alloy comprising more than 33% and less than 50% zinc by weight; and a power amplifier on a beam path, wherein, in operational use, the master oscillator produces a seed light beam that propagates on the beam path and is amplified by the power amplifier.

12. The DUV light source of clause 11, wherein the power amplifier comprises:

a first power amplifier electrode; and a second power amplifier electrode separated from the first power amplifier electrode to form a power amplifier discharge region, the power amplifier discharge region configured to receive a gain medium comprising a noble gas and a halogen gas, wherein at least one of the first power amplifier electrode and the second power amplifier electrode comprise a metal alloy comprising more than 33% and less than 50% zinc by weight.

13. An anode for a deep ultraviolet (DUV) light source, the anode comprising:

a substrate of a metal alloy material comprising at least one metal component; and a surface on one side of the substrate, wherein in operational use, the surface is positioned to face a cathode and a discharge region having a gain medium comprising a halogen gas, the metal component in the surface reacts with the halogen gas to form a layer of protective material on the surface, and the layer of protective material covers the entire surface after at least thirty billion occurrences of an electrical discharge between the anode and the cathode.

14. The anode of clause 13, wherein the layer of protective material has a substantially uniform electrical conductivity after at least thirty billion occurrences of an electrical discharge between the anode and the cathode.

15. The anode of clause 13, wherein the layer of protective material has a substantially uniform thickness along a direction that is parallel to a normal of the surface.

16. The anode of clause 13, wherein the at least one metal component of the substrate comprises zinc.

17. The anode of clause 16, wherein the metal component of the substrate is more than 33% and less than 50% zinc by weight.

18. The anode of clause 13, wherein the substrate and the surface form a single, bulk structure of the metal alloy.

19. The anode of clause 16, wherein the metal alloy comprises a second metal component, the second metal component comprising copper.

20. The anode of clause 19, wherein the metal alloy further comprises nickel.

21. A method of operating a discharge chamber of a deep ultraviolet light source, the method comprising:

applying a voltage to a discharge chamber that comprises a first electrode and a second electrode, the voltage being sufficient to cause a population inversion in a gaseous gain medium comprising a halogen gas in a discharge region between the first electrode and the second electrode;

allowing a metal component in the first electrode and/or the second electrode to react with the halogen gas to form a layer of protective material on a surface that faces the discharge region; and continuing to apply and remove the voltage such that the voltage sufficient to cause the population inversion is provide to the discharge chamber at temporal intervals and for a total of at least thirty billion applications of the voltage to produce a pulsed light beam.

22. A electrode configured for use in an excimer laser source, the electrode comprising a metal alloy comprising more than 33% and less than 50% zinc by weight.

Other implementations are within the scope of the claims.

What is claimed is:

1. A discharge chamber for a deep ultraviolet (DUV) light source, the discharge chamber comprising:

a housing; and an anode and a cathode in the housing, the anode and the cathode being separated from each other to form a discharge region between the anode and the cathode, the discharge region being configured to receive a gain medium comprising at least one noble gas and a halogen gas, wherein the anode consists only of a single anode bulk material and the cathode consists only of a single cathode bulk material, and the anode bulk material comprises a metal alloy comprising 35% to 50% zinc by weight.

2. The discharge chamber of claim 1, wherein the cathode bulk material comprises the metal alloy comprising 31% to 40% zinc by weight.

3. The discharge chamber of claim 1, wherein the cathode bulk material comprises the metal alloy comprising 33% to 40% zinc by weight.

4. The discharge chamber of claim 1, wherein the cathode bulk material comprises the metal alloy comprising 31% to 38% zinc by weight.

5. The discharge chamber of claim 1, wherein the cathode bulk material comprises the metal alloy comprising 31% zinc by weight or 37% zinc by weight.

6. The discharge chamber of claim 1, wherein the anode bulk material comprises the metal alloy comprising 36% to 49% zinc by weight.

7. The discharge chamber of claim 1, wherein the anode bulk material comprises the metal alloy comprising 37% zinc by weight or 48% zinc by weight.

8. The discharge chamber of claim 1, wherein the metal alloy further comprises copper.

9. The discharge chamber of claim 1, wherein the halogen gas comprises fluorine.

10. The discharge chamber of claim 1, wherein the noble gas comprises argon, krypton, neon, and/or xenon.

11. A deep ultraviolet (DUV) light source comprising:

a master oscillator comprising a master oscillator anode and a master oscillator cathode, the master oscillator anode and the master oscillator cathode being separated from each other to form a master oscillator discharge region, the master oscillator discharge region configured to receive a gain medium comprising a noble gas and a halogen gas, wherein the master oscillator anode consists only of a single anode bulk material and the master oscillator cathode consists only of a single cathode bulk material, wherein the anode bulk material comprises a metal alloy comprising 35% to 50% zinc by weight; and a power amplifier on a beam path, wherein, in operational use, the master oscillator produces a seed light beam that propagates on the beam path and is amplified by the power amplifier.

12. The DUV light source of claim 11, wherein the power amplifier comprises:

a power amplifier anode; and a power amplifier cathode separated from the power amplifier anode to form a power amplifier discharge region, the power amplifier discharge region configured to receive a gain medium comprising a noble gas and a halogen gas, wherein the power amplifier anode consists only of a single anode bulk material and the power amplifier cathode consists only of a single cathode bulk material and wherein the anode bulk material of the power amplifier anode comprises a metal alloy comprising 35% to 50% zinc by weight.

13. A discharge chamber for a deep ultraviolet (DUV) light source, the discharge chamber comprising:
   a discharge region containing a gain medium comprising a halogen gas;
   an anode comprising a substrate consisting solely of a single bulk material comprising a metal alloy comprising 33% to 50% zinc by weight; and a surface on one side of the substrate and positioned to face a cathode and the discharge region; and
   a layer of protective material on the surface of the anode, the layer of protective material formed from a reaction between zinc in the metal alloy and the halogen gas.

14. The discharge chamber of claim 13, wherein the layer of protective material has a substantially uniform electrical conductivity after at least thirty billion occurrences of an electrical discharge between the anode and the cathode.

15. The discharge chamber of claim 13, wherein the layer of protective material has a substantially uniform thickness along a direction that is parallel to a normal of the surface.

16. The discharge chamber of claim 13, wherein the metal alloy comprises 35% to 50% zinc by weight.

17. The discharge chamber of claim 13, wherein the substrate and the surface form a single, bulk structure of the metal alloy.

18. The discharge chamber of claim 16, wherein the metal alloy comprises a second metal component, the second metal component comprising copper.

19. The discharge chamber of claim 16, wherein the metal alloy further comprises nickel.

20. An anode configured for use in an excimer laser source, the anode comprising a substrate consisting only of a single anode bulk material comprising a metal alloy comprising 35% to 50% zinc by weight, and a layer of protective material on a surface of the substrate, the layer of protective material formed from a reaction between zinc in the metal alloy and a halogen gas in a region adjacent the anode.

21. The discharge chamber of claim 1, wherein a layer of protective material covers a surface of the anode facing the cathode, the layer of protective material including a reaction product formed by a reaction of the zinc of the metal alloy and the halogen gas of the gain medium.

22. The discharge chamber of claim 21, wherein the layer of protective material covers the entire surface.

23. The discharge chamber of claim 13, wherein the layer of protective material covers the entire surface of the anode.

* * * * *